Patented July 17, 1934

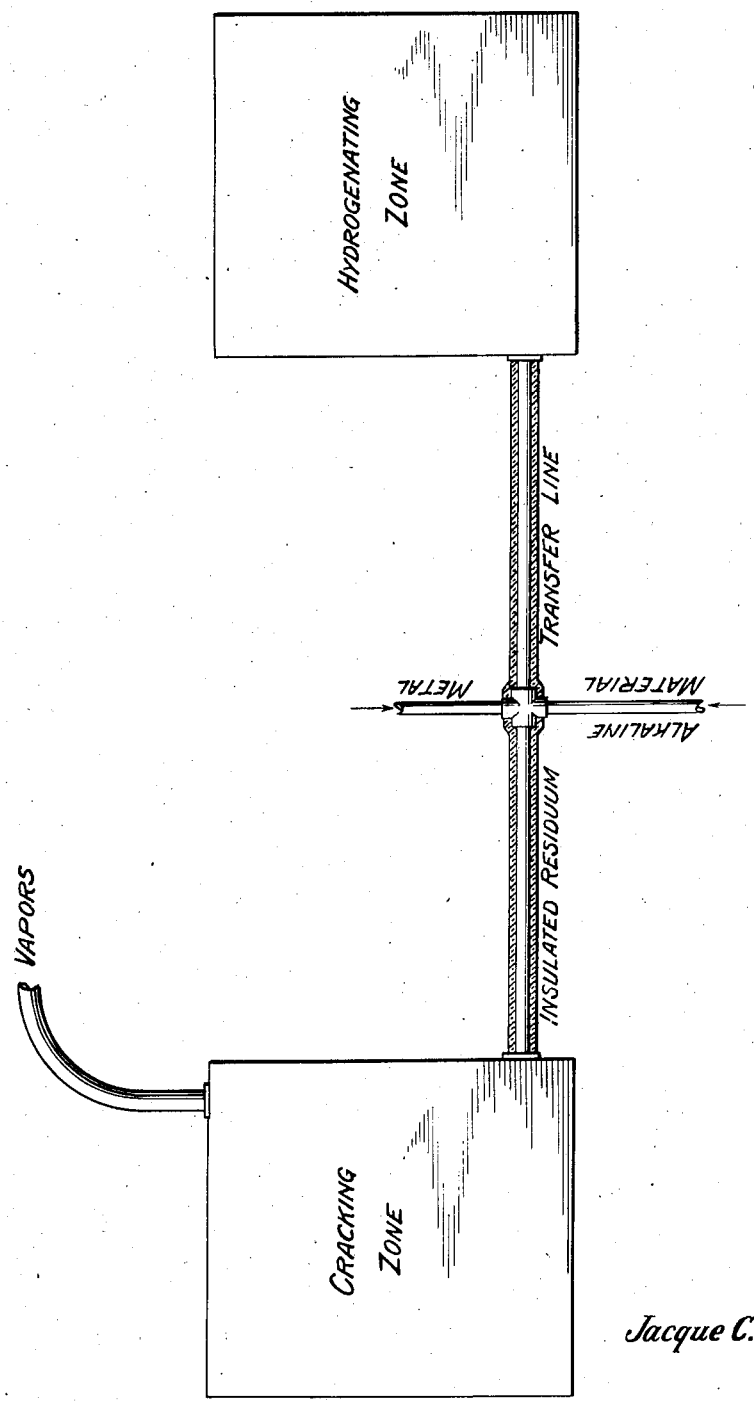

1,966,455

UNITED STATES PATENT OFFICE 1,966,455

TREATMENT OF HYDROCARBON OILS

Jacque C. Morrell, Chicago, Ill., assignor to Universal Oil Products Company, Chicago, Ill., a corporation of South Dakota Application February 21, 1930, Serial No. 430,399

2 Claims. (Cl. 196—62)

This invention relates to a process for the treatment of hydrocarbon oils, and refers more particularly to a process for the hydrogenation of oils at elevated temperatures.

Among the objects of the process is to increase the yield of the lower boiling products made by the thermal decomposition or cracking of higher boiling oils.

In the operation of the process of my invention, finely divided metals are introduced simultaneously with a basic material or alkali in those portions of the cracking system where the oil is a nonvaporized product of the process.

For a clearer understanding of the invention, reference is had to the accompanying diagrammatic drawing, which bears appropriate legends and wherein the cracking zone is intended to exemplify a vapor separating zone, such as a reaction or flash chamber, or the like.

In the specific embodiment of the present invention, the hydrocarbons are treated in the liquid state, with especial application to the hydrogenation of the non-vaporized residue from the reaction and flash chamber of the cracking process. For example, the invention may be used in a process well known in the art wherein oil is heated in a continuous coil and discharged in a reaction chamber from which is withdrawn the vaporous products resulting from the distillate and cracking and a non-vaporized residue. The residue from the reaction chamber may be treated according to the present invention by passing same through an insulated pipe or vessel, introducing the finely divided metal and alkali at this stage or preferably by the application of external heat to the residue leaving the reaction chamber while in the presence of alkali and the finely divided metal.

In one mode of operation the non-vaporized residue is discharged from the reaction chamber under pressure and is vaporized by its self-contained heat in a vessel at lower pressure, the amount of vaporization depending upon the temperature, average boiling point of the residue, and the pressure within the low pressure vessel or flash chamber. This flashed residue may be likewise treated by heating in the presence of finely divided metals and alkali.

The non-vaporized hydrocarbon oils and basic materials or alkali or substances giving an alkaline reaction are mixed with finely divided metals which react with the alkali at elevated temperatures to produce hydrogen. Preferably, the alkali is introduced into the oil in aqueous solution.

As examples of alkalies, the hydroxides of sodium, potassium, ammonium, calcium, barium, strontium, and/or the corresponding oxides and carbonates may be used. The alkali reacts with the finely divided metal producing hydrogen in situ. This hydrogen is more active than ordinary molecular hydrogen and is sometimes spoken of as being in the nascent state, reacts with the chemically unsaturated portions of the oil as well as with sulfur compounds, saturating in part the pitchy and unsaturated or olefinic hydrocarbons and reducing some of the higher sulfur compounds to hydrogen sulfide which may readily be removed from the final products.

As examples of metals, I may use sodium, potassium, calcium, magnesium, zinc, aluminum, iron, tin, and others, including alloys and amalgams, preferably the metals which are electropositive to hydrogen, i. e., are above hydrogen in the electromotive series, and which liberate hydrogen from steam. The oxides or metals formed by the reaction with steam have some catalytic action in promoting the hydrogenation and desulfurization as well as assisting in the cracking. The use of finely divided metals has an additional advantage in that the finer the metal the greater the surface exposure and consequently the greater the velocity or rate of reaction.

In addition to the above I may also add molecular hydrogen to the materials undergoing reaction in order to assist in the reaction, or I may add gases containing hydrogen such as gases from oil cracking, coke oven gas, producer gas, natural gas, et cetera.

In operating the process of the invention I may make use of any conventional apparatus or equipment suitable for cracking, but preferably I make use of a cracking system consisting of heating tubes or elongated pipe or heating coil in combination with a reaction chamber, dephlegmator or fractionating means and the auxiliary cooling, condensing, and collecting devices. In the operation of the process I preferably return the reflux or distillates condensed in the dephlegmating or fractionating means to the heating equipment for reconversion. Auxiliary heating equipment may be used to heat the mixture of non-vaporized residue, metals and alkalies.

Preferably, the oil is heated to a cracking temperature, although my invention contemplates operating the process at lower temperatures also. Preferably the process is operated at superatmospheric pressure, and may in some cases also be operated at atmospheric, reduced or sub-atmospheric pressures. Preferably I make use of superatmospheric pressures ranging from 75 pounds to 3000 pounds, more or less, and at temperatures of from approximately 400° to 1400° F.

As an example of the process, a 24-26 A.P.I. gravity Mid-continent topped crude when subjected to a cracking temperature of approximately 930° F. and a pressure of approximately 1000 pounds shows an approximate yield of gasoline of fifty percent, in addition to approximately forty-five percent of liquid fuel oil of good viscosity and very low sludge or coke content. Approximately five percent of coke and gas are also produced. The sulfur content of the gasoline produced, which would normally be approximately 0.25 percent, may be reduced to approximately 0.1 percent.

The above example is illustrative and is not to be construed as a limitation upon my invention.

I claim as my invention:

1. A process for treating the residuum formed in the pressure cracking of hydrocarbon oils which comprises removing such residuum from the cracking process and mixing therewith, while the residuum is still in highly heated condition, an alkaline material and a metal capable of reacting with each other to form sufficient nascent hydrogen to partially saturate unsaturated hydrocarbons, subjecting the resultant mixture to hydrogenating conditions of temperature and pressure adequate to form lower boiling hydrocarbons and using the heat derived from the cracking and present in the residuum toward obtaining the hydrogenating temperature.

2. A process for treating the residuum formed in the pressure cracking of hydrocarbon oils which comprises removing such residuum from the cracking process and mixing therewith, while the residuum is still in highly heated condition, an alkaline material and a metal capable of reacting with each other to form sufficient nascent hydrogen to partially saturate unsaturated hydrocarbons, subjecting the resultant mixture to hydrogenating conditions of temperature and pressure adequate to form lower boiling hydrocarbons and using the heat derived from the cracking and present in the residuum toward promoting the formation of nascent hydrogen.

JACQUE C. MORRELL.